United States Patent
van der Salm et al.

(10) Patent No.: US 6,345,184 B1
(45) Date of Patent: Feb. 5, 2002

(54) METHOD, DEVICE AND TELECOMMUNICATION SYSTEM FOR PROVIDING A CONSISTENT SET OF SERVICES TO A ROAMING USER

(75) Inventors: Peter van der Salm, Utrecht (NL); Sten Erik Blomstergren, Hasselby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/180,090
(22) PCT Filed: May 1, 1997
(86) PCT No.: PCT/EP97/02325
   § 371 Date: Apr. 12, 1999
   § 102(e) Date: Apr. 12, 1999
(87) PCT Pub. No.: WO97/42781
   PCT Pub. Date: Nov. 13, 1997

(30) Foreign Application Priority Data

May 3, 1996 (EP) ............................................. 96201228

(51) Int. Cl.⁷ ................................................. H04Q 7/20
(52) U.S. Cl. ........................................ 455/432; 455/414
(58) Field of Search .............................. 455/432, 433, 455/552, 553, 509, 414, 422, 575, 465

(56) References Cited

FOREIGN PATENT DOCUMENTS

| EP | 0 602 779 | * | 6/1994 |
| GB | 43 43 335 | * | 6/1995 |
| GB | 2 292 047 | * | 2/1996 |

* cited by examiner

*Primary Examiner*—Nay Maung
*Assistant Examiner*—Quochien B. Vuong
(74) *Attorney, Agent, or Firm*—Burns, Doane, Swecker & Mathis, L.L.P.

(57) ABSTRACT

In a telecommunication system including a plurality of communication networks a user is provided with a consistent set of services when roaming through the networks using a telecommunication device, such as radio telephone. Data specific to services of the telecommunication system are stored in memory means of the telecommunication device and the communication networks. Service specific data are exchanged between the telecommunication device and the communication networks when accessing a communication network and/or a particular service thereof. The exchanged data are processed such to provide services to the user in accordance with a user interface known to the user.

28 Claims, 4 Drawing Sheets

METHOD, DEVICE AND TELECOMMUNICATION SYSTEM FOR PROVIDING A CONSISTENT SET OF SERVICES TO A ROAMING USER

FIELD OF THE INVENTION

The present invention relates generally to telecommunication systems comprising a plurality of communication networks through which a user can roam, such as a mobile or cordless telecommunication user, and more particularly to a method of and a telecommunication system equipped for providing a consistent set of services to a user when roaming through the networks of a system.

BACKGROUND OF THE INVENTION

Typical cordless radio communication networks such as operating in accordance with the Digital Enhanced Cordless Telecommunications (DECT) standard, generally comprise a plurality of radio base stations which connect to a so-called central interface unit or radio exchange which, in turn, is connected to or integral with a Private Branch Exchange (PBX). Each base station covers a limited area, generally called a cell, within which a wireless communication link can be established with a remote telecommunication device such as a portable radio telephone. A call in progress can be handed over from one base station to another while the remote telecommunication device is moving in the coverage area of the radio network.

A plurality of cordless radio communication networks, such as networks installed at geographically spread sites of a company or public radio networks each covering a particular city, for example, may form a radio telecommunication system to which a user may have acquired access rights. The several networks of a system may operate in a so-called stand-alone or in a mutually interconnected configuration. In the latter case using the Public Switched Telephone Network (PSTN) or private or leased lines for the coupling of the networks, for example.

Despite the current approach for open or generic communication protocols and interfaces, the different telecommunication devices and/or the networks obtained from different manufacturers may still require different access procedures and protocols for accessing network services, for example.

Services like diverting a call to a user or closing off the divert function may, in different networks, require different commands from the telecommunication device. For example, a service like Call Back (CB) may in one network be initiated by dialing a "5", for example, whereas this service is accessed in another network by dialing a "3" or is not available at all. Without any additional support from the system, a user roaming through the several networks has to posses the relevant knowledge of how to access the different services in the different networks. From a service point of view, this is not a user friendly solution.

Short number dialing is an example of a service which, in general, has a limited use. For instance, in a first network the subscribers thereof may be accessed by a three digit telephone number which can be stored in a memory of a telecommunication device. However, using the same device in a second network, for instance a network at a different site of a company, the short numbers that are stored in the telecommunication device cannot be used as these numbers refer now to the subscribers of the second network or even to non-existing subscribers in the second network. Thus, in order to set up a call, the stored numbers need to be preceded by suitable access codes or prefixes, such as access codes for getting connected to an external line, area codes etc. which can be different for and from each individual network and, accordingly, have to be known by the user of the telecommunication device.

Further, in the case of services such a Call Forwarding on No Reply (CFNRy) or Call Forwarding on Busy (CFB), a user may have stored in a database of the communication system—such as a database located at the home network of the user—a plurality of extension numbers to which incoming calls have to be forwarded. The home network of a user is in general the network at which subscriber specific information of a user is registered such as access rights, information for billing purposes, etc.

When roaming to a different (visited) network, these data are not known to this network and, in the case of a telecommunication system having interconnected networks, the relevant data have to be transferred by the telecommunication system from the home network database to the visited network database whenever the user is registered at a visited network, for example. In another embodiment the visited network has to set up inquiry calls to the home network to fetch the relevant data on a case by case basis, for example. However, the network features or the network support for establishing such data transfers or inquiry calls, for example, are not yet generally available whereas also a considerable amount of signaling load is imposed on the telecommunication system in those cases wherein such network features are already available.

German patent application DE 43 43 335 discloses a multi mode radio telephone terminal (GSM/DECT) which, among others, provides the user with a network independent interface for call set up. The radio telephone is provided with means for establishing the network to which the radio telephone is currently connected and means for storing a complete subscriber number, i.e. area code, local prefix and terminal number of a preferred network, for example the network at which the user is available during business hours. The radio telephone is further provided with means for processing a dialled telephone number.

Independent of the network to which the radio telephone currently connects, the user may dial a telephone number in accordance with the interface of the preferred network. A dialled telephone number is processed in accordance with the stored subscriber number and call set up information of the network to which the radio telephone currently connects. Accordingly, the user can place calls from the radio telephone terminal without having knowledge of call set up procedures different from his preferred network or home network. That is, the user is provided with a universal user interface for call set up.

British patent application 2,292,047 discloses a radio telephone having different software modules bearing software such that services can be executed from the radio telephone in at least two different networks having different service software requirements. This British patent application is not concerned with the above described problem of providing a user interface independent of the network to which a radio telephone currently connects.

Both, DE 43 43 335 and GB 2,92,047 disclose a fixed storage of service specific data when the radio telephone is used for the first time.

SUMMARY OF THE INVENTION

The present invention has for its object to provide in a cost effective, flexible and efficient manner a consistent set of services, inclusive call set up, to a telecommunication user roaming in or between networks of a telecommunication system. In particular to provide the set of services to the user in a uniform manner such that, while roaming through different networks, the user does not have to possess the knowledge of how to access the different services in the different networks.

The present invention has also for its object to provide a telecommunication device and a telecommunication system equipped for providing a consistent set of services to a user when roaming through different networks of a-telecommunication system. In particular a radio telecommunication device by which a user may access different radio communication networks, such that while roaming from one network to another the user can access the different services of a system in a consistent manner by using one and the same telecommunication device. For example, a cordless telephone operating in accordance with the DECT standard.

According to the invention there is provided in a telecommunication system including a plurality of communication networks a method of providing a user with a consistent set of services when roaming through the networks using a telecommunication device having memory means for storing data specific to services of the telecommunication system. The method comprises the steps of:

exchanging service specific data between the telecommunication device and a communication network when accessing the communication network and/or a particular service, and processing the exchanged data, such to provide services to the user in accordance with the service specific data.

Following the invention, data relating to services available in the telecommunication system are stored in the telecommunication device, such as a radio telephone terminal, and the telecommunication networks. Accordingly, when roaming in or between the several networks of a telecommunication system the relevant data for accessing or completing a service can be directly exchanged between the telecommunication device and a communication network. Thereby providing a flexibel system, not limited to predifined user data and network data such as the prior art systems disclosed above and eliminating the need for significant system data transfers and, accordingly, delays when retrieving data from a home database or a central system database, for example.

Such service specific data may contain, for example, subscriber numbers to which an incoming call has to be diverted when the telecommunication device is busy or when the user has switched the device into a non-disturbance mode, for example. Further, the service specific data may comprise access codes for accessing services in the different networks, prefix codes in the case of a short number service, etc.

In an embodiment of the method according to the invention, at least part of the user specific data is exchanged over a transmission path established between the telecommunication device and the network, and the retrieved data are stored in memory means of the network.

Service specific data may be exchanged with a telecommunication device after or in the course of its registration at a network following a registration procedure when the device is put into operation, for example. The exchanged data may be temporarily stored in the memory means of the network and/or the telecommunication device, at least for the duration of providing service to the telecommunication device. The service specific data may be completely downloaded by the network or on a service-by-service basis, for example.

In an embodiment of the method according to the invention, the service specific data are stored in the memory means of the telecommunication device relative to data identifying a particular network or a group of networks.

Accordingly, the network may retrieve only those service specific data which refer to the particular network or services of the network. This provides a very efficient data transfer and storage because data relevant to several networks may be commonly stored in a telecommunication device under the same heading, for example.

In another embodiment of the invention, at least part of the service specific data is retrieved and processed by the telecommunication device. That is, relative to the data identifying a network or a group of networks, for example, when accessing a particular service the telecommunication device retrieves and processes such service specific data required for completing the service.

The service specific data stored in the memory means of the telecommunication device may be restricted to those services available to the user of the particular device. Accordingly, access from a particular telecommunication device to services for which no access rights have been acquired can be effectively prevented.

In yet another embodiment of the invention the service specific data in the memory means of the telecommunication device may contain or may be stored relative to data corresponding to service access rights indicating the services which are available to a user. In such embodiment, service specific data are retrieved and/or processed in accordance with these service access rights. In general, the user of a telecommunication device is only allowed to have access to those services to which access rights have been acquired.

In order to prevent unauthorized use of services as much as possible, the service specific data and/or access rights data may be stored in an encrypted manner. The type of encryption or an encryption key may be chosen in relation to a particular telecommunication system or a particular system operator, for example. It will be appreciated by those skilled in the art that access of the services may be subject to a Personal User Identification (PIN) code or other password or the like.

A telecommunication system can be regarded user friendly whenever services and other features can be approached following a single (access) procedure. With the present invention, this can be provided very easily by storing the service specific data in the memory means of the telecommunication device in accordance with apredetermined user interface. That is to say, to access a particular service the user needs only to know a unique set of key actuations, for example. Dependent on the network to which the device is presently registered, the particular key actuations are converted into commands which can be interpreted by the network.

The conversion is efficiently achieved, in an embodiment of the invention, by storing the service specific data in the form of a matrix type translation table or a translation algorithm. One input parameter of the table or algorithm may be formed by the network identity and another (set) of input parameters may be formed by the user interface commands of a particular type of service, for example.

The user interface can be chosen from the user interface of a particular network of the system, for example the home network of the telecommunication device, a dedicated user interface or any other type of user interface. Note that the different telecommunication devices of a system may operate according to different user interfaces, for example the user interface of their respective home networks.

Service specific data can be stored in the memory means of a telecommunication device over a wired data link, for example a data link coupled to a personal computer, over a radio link, preferably a radio link between a radio communication device and its home network, or another type of data path, such as the keypad means of a communication device, for example a telephone keypad. In the latter case one may think of subscriber numbers to which an arriving telephone call has to be forwarded in case of busy etc. The storage of certain type of data, such as access rights for example, may be limited to a system or network operator or other authority. The service specific data or part thereof may also be stored in memory means which can be separately connected to a telecommunication device, such as a Read Only Memory (ROM) module.

When a telecommunication device registers itself at a network, the network may transfer relevant service specific data to the memory means of the telecommunication device. For example, data relating to access or prefix codes to set up an external, international or other type of call requiring special access codes in the network, for example. Accordingly, in the case of setting up a call using a short number valid for the home network of a subscriber, using the data received from the particular network the telecommunication device can extract the relevant access and/or prefix codes which have to be added to the short number in order to complete the call from the network.

The invention relates also to a telecommunication device, in particular a radio telecommunication device such as a radiotelephone set, for use in a telecommunication system including a plurality of communication networks. The telecommunication device comprises transceiver means, communication control means, and memory means. The memory means are arranged to store data specific to services of the telecommunication system. The telecommunication device is further arranged for exchanging service specific data between the telecommunication device and a communication networkwhen accessing the communication network and/or a particular service thereof.

In an embodiment of the telecommunication device according to the present invention, the memory means are arranged for storing the service specific data in connection with access data identifying a particular network or a particular group of networks. Wherein means are provided for identifying an accessed communication network, which means are operatively connected to the memory means such to retrieve service specific data corresponding to the network or group of networks accessed.

The telecommunication device may comprise display means and user interface control means for displaying service specific user data in accordance with a particular user interface, such to provide a network independent access of the system services. It has proven to be efficient if the memory means are arranged to store the service specific data relative to a particular interface, for example in the form of a translation table or a translation algorithm, such to translate service specific data relative to the user interface into service specific data which can be processed by the accessed network.

The telecommunication device may comprise one or a combination of means for storing service specific data into the memory means received via its transceiver means, via other data input means connectable to the telecommunication device and/or keypad means of the telecommunication device. For receiving memory means separate to the telecommunication device, in another embodiment of the invention, a connector is provided by which the memory means can be releasable connected to the relevant circuitry of the telecommunication device.

The invention further relates to a radio telecommunication system, including a plurality of radio communication networks each comprising radio exchange means, at least one radio base station operatively connected to the radio exchange means and comprising radio transceiver means and communication control means for exchanging information over a radiolink with at least one radio communication device. Such as a cordless radio communication system operating in accordance with the DECT standard. Following the invention a radio communication network of the system comprises means for exchanging service specific data with a radio communication device and memory means for storing retrieved service specific data.

In a yet further embodiment of the radio communication system the data retrieval and memory means are located at the radio exchange means, at the or each base station, and/or at switching means to which the radio communication network connects via the radio exchange means.

In the preferred embodiment of the radio communication system according to the present invention a radio communication network comprises means for providing service specific data to be stored in memory means of a radio communication device, which means are arranged for transmitting service specific data via a radio link established between a base station and a radio communication device, or via data input means connectable to the radio communication device.

The above-mentioned and other features and advantageous of the invention are illustrated in the following description with reference to the enclosed drawings.

DETAILED DESCRIPTION OF THE EMBODIMENTS

Without the intention of a limitation, the invention will now be explained by its application in a cordless radio telephone telecommunication system.

Figure 1:
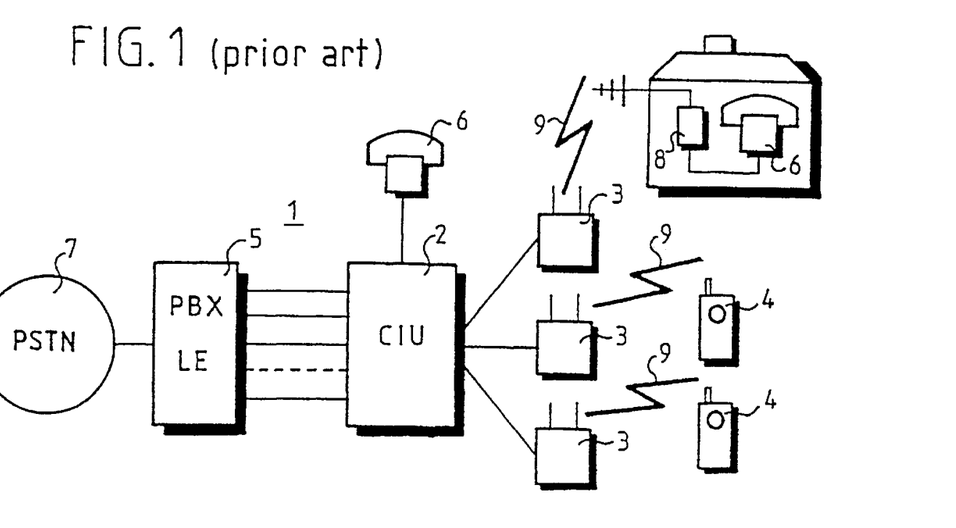
FIG. 1 shows, in a schematic and illustrative manner, a typical prior art cordless radio communication network.

FIG. 1 illustrates a typical cordless radio communication network generally designated by reference numeral 1. The radio network comprises three distinct elements: a Central Interface Unit (CIU) or radio exchange 2, a plurality of compact radio access units or base stations 3, which are installed throughout the area to be covered and connect directly to the CIU 2, and remote cordless or wireless telecommunication devices in the form of portable radio telephones or handsets 4 which connect over a radio link 9, also called air interface, to the radio base stations 3.

Each radio base station 3 provides service to a given area, called a cell, which is surrounded and/or overlapped by other cells of other radio base stations 3, i.e. a so-called multi-cell approach. The radius of indoor cells amounts typically from 10 m–100 m, whereas the radius of outdoor cells typically ranges from 200 m up to 5000 m.

The CIU 2 is connected to or integral with a wired exchange 5 to which a plurality of wired telephones 6 can be connected. In business environments, this exchange 5 is generally a PBX (Private Branch Exchange) whereas in outdoor applications, such as Radio in the Local Loop (RLL) or Cordless Terminal Mobility (CTM), the exchange 5 is generally a Local Exchange (LE) which, like the PBX, is connected to a Public Switched Telephone Network (PSTN) 7, i.e. the ordinary wired public telephone network.

In RLL applications, the radio base stations 3 may also connect over a radio link 9 with a so-called (Wireless) Fixed Access Unit ((W)FAU) 8 which connect to a fixed telephone terminal or socket for the connection of a wired telephone 6. In RLL providing local mobility in the home, for example, the (W)FAU 8 is additionally arranged to establish a radio link with a handset 4 in the home (not shown).

Users may set up and receive calls via the CIU 2 in each of the cells covered by a radio base station 3. A call in progress is handed over from one base station 3 to another while a user is moving in the coverage area of the radio network 1.

Figure 2:
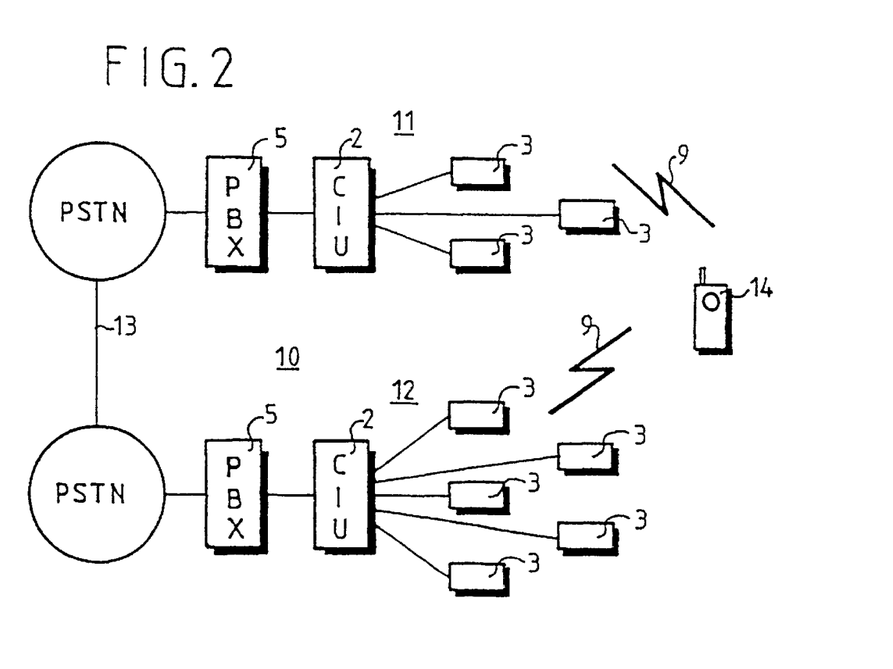
FIG. 2 shows, in a schematic and illustrative manner, a radio telecommunication system including different radio communication networks such as the radio communication network shown in FIG. 1.

FIG. 2 shows a radio telecommunication system 10 comprising a first radio network 11 and a second radio network 12 both having a configuration like the radio network 1 described above in connection with FIG. 1. The radio networks 11, 12 are interconnected via a link 13, which may be a line of the PSTN or a private or leased line, for example. Note that the link 13 may be formed by a wired line, an optical fibre and/or a radio link, for example. The radio networks 11, 12 are arranged such that by one and the same handset 14 calls can be placed and received in both networks. The first radio network 11 may be installed at a first site of a company, whereas the second radio network 12 may be installed at a second site of the same or an affiliated company, for example. These sites may be geographically separated by a distance such that the radio coverage areas of the networks do not overlap. Thus, a user roaming from the first network 11 to the second network 12 may take his own handset 14 with him an may place and receive calls in both networks.

It will be appreciated by those skilled in the art of cordless radio communication systems that the system 10 may comprise a plurality of radio networks from the same or different manufacturers, however operating in accordance with the same open cordless radio communication standard, such as DECT. Instead of proprietary radio networks, the system 10 may also take the form of a public radio communication system comprising radio networks covering whole or part of a city or town and which is controlled by a public operator, for example. A user having obtained access rights to all or part of the radio networks (i.e. cities) may use his own telephone terminal while roaming from one city to another.

Generally, one of the networks is designated the home network of a user. In his home network the user is registered as a subscriber. The home network is in general the network in the coverage area of which a user lives or works and in which the telephone is used for the greater part. By the other networks the user is then regarded as a visitor.

Figure 3:
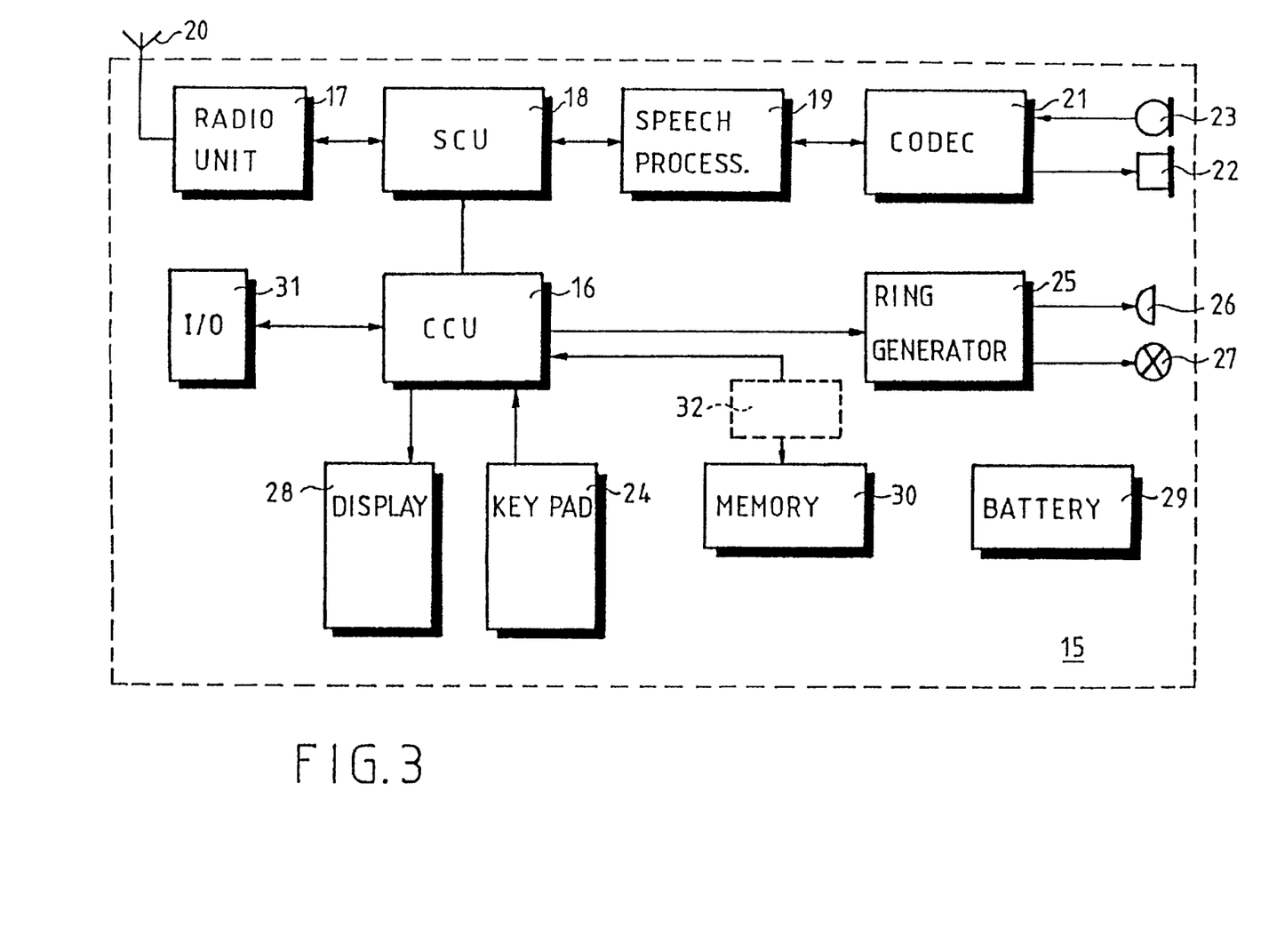
FIG. 3 shows a simplified block diagram of a radio communication device having the form of a telephone according to the present invention.

FIG. 3 shows a simplified block diagram of a wireless or cordless telecommunication device having the form of a radio telephone terminal 15 for use with the present invention, in particular for operation in accordance with the DECT standard. The radio telephone terminal 15 has four essential building blocks, i.e. a Central Control and application logic Unit (CCU) 16, a radio unit 17, a timing and Synchronisation Control Unit (SCU) 18 and a speech processing unit 19. The radio unit 17 comprises an air interface 20 having an antenna system coupled to a transceiver unit comprising a transmitter/modulator and a receiver/demodulator (not shown).

The SCU 18 receives data over the air interface 20 and the radio unit 17 from a radio access unit or base station 3 (FIG. 1), which data are processed in accordance with the system clock timing provided by the CIU or radio exchange 2 (FIG. 1), for example. Signalling and synchronisation data information are removed from the received data by the SCU 18 and speech data are fed to the speech processing unit 19. The speech processing unit 19, among others, takes care of the deciphering of received data. A codec 21 decodes the received Digitised speech data into Analogue form (i.e. D/A conversion) for making it audible to a user of the handset via a loudspeaker 22 connected to the codec 21. Speech produced by the user is received by a microphone 23 and encoded into a suitable digital format by the codec 21, i.e A/D conversion.

This encoded speech data is fed to the speech processing unit 19 which, among others, takes care of encryption of the speech data. The SCU 18 adds suitable synchronisation and signalling information to the encrypted speech data. The radio unit 17 transmits this signalling and speech data via the air interface 20 for reception by a radio base station 3 (FIG. 1) of the communication system to which the telephone set 15 is operatively connected.

The CCU 16 comprises a microprocessor or microcontroller and memory means containing the software program for the operation of the microprocessor and the control information with regard to the operation of the device and connects operatively to the SCU 18. The CCU 16 essentially controls the system data and the communication with the user of the radio telephone set 15 via a keypad means 24, display means 28 and ring generator means 25, all operatively connecting to the CCU 16. Frame and time slot allocation in a Time Division Multiple Access (TDMA) communication mode and also the allocation of various combinations of carrier frequencies and time-slots in the case of a multi-carrier multi-time-slot technology such as DECT are controlled by the CCU 16.

The ring generator means 25 connect to a buzzer 26 for producing a ringing or alerting sound at the arrival of a call. Optionally a visual alerting signal may be emitted by a lamp or Light Emitting Diode (LED) 27, connected as shown. The display means 28, such as an LCD device, are operatively connected to the CCU 16 for displaying call information and other user and system data. For the overall powering of the telephone set 15 a battery and powering unit 29 is included.

Following the present invention, thetelephone terminal 15 is provided with memory means 30 which, in the embodiment shown, are operatively connected to the CCU 16. The memory means 30 may be comprised of several memory modules. Such as a first non-volatile memory module for the retrieval and storage of service specific data specified by an operator of the communication system, for example. A second non-volatile memory module for storing and retrieving service specific data inputted by the user of the communication device 15 via the keypad 24, for example. As well as a third volatile memory module which during operation of the communication device 15 contains service specific data relevant during the use of the communication device in the home or visited network or during the use of a specific service, for example.

In an embodiment of the invention, the memory 30 comprises a first memory module in the from of a so-called flash Electrically Erasable and Programmable Read Only Memory (EEPROM); a second memory module comprising an EEPROM of the type requiring write and erase voltages within the range of the battery 29, and a third memory module in the from of a Random Access Memory (RAM). For a skilled person it will be clear that the second memory module may also form part of the flash memory provided that the battery 29 suits the voltages and power required for the erasure and programming of the flash memory.

In the embodiment of the communication device 15 shown in FIG. 3, service specific data can be stored at and retrieved from the memory means 30 via the air interface 20 through the radio unit 17, the SCU 18 and the CCU 16, via the keypad means 24 and a separate data input/output port 31. The I/O port 31 may comprise a conventional plug or socket type connector, e.g. an RS 232 data interface, infrared data transfer means, inductive data transfer means, capacitive data transfer means etc. Such to store data in the memory means from a personal computer or other device (not shown).

Further, as schematically indicated by broken lines, the memory means 30 or the first module thereof, for example, may be a separate component which can be releasably connected to the CCU 16 through a connector means 32. Memory means and connector means of this type are known in the art. Although the communication device 15 has been showed in the form of a portable wireless telephone set, part thereof i.e. essentially designated by the reference numerals 16–21, 25 and 29–31 may form a (W)FAU (FIG. 1).

Under the control of the CCU 16 and appropriate software, the user may select via the keypad means 24 a particular user interface, i.e. a user interface of any of the networks of the telecommunication system or a universal system user interface, for example. The selection may be supported by the display means 28, for example.

Figure 4:
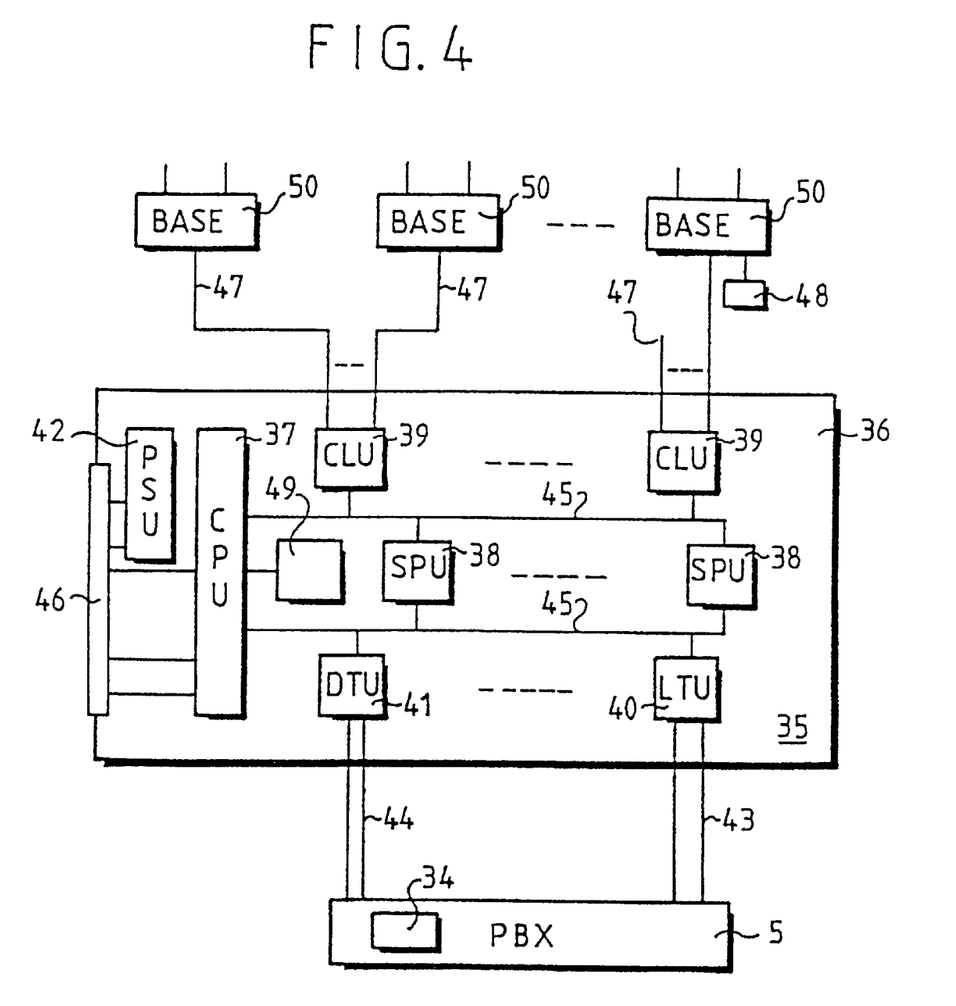
FIG. 4 shows a simplified block diagram of an embodiment of a Central Interface Unit (CIU) forming part of a radio communication system according to the present invention.

FIG. 4 shows a functional block diagram of an embodiment of a CIU or radio exchange 35 for use in a radio communication system in accordance with the present invention. The CIU 35 comprises a housing 36 containing a Central Processing Unit (CPU) 37, Speech Processing Units (SPU) 38, Cell Link Units (CLU) 39 and Line Termination Units (LTU) 40 and/or Digital Trunk Units (DTU) 41. The several units are connected to a digital system bus 45, and are powered by a Power Supply Unit (PSU) 42.

The CPU 37 provides the overall control of the system and performs the tasks of system initialisation, call processing and intra-system mobility management. System testing and fault recovery and system statistics information are also provided by the CPU 37, which information is available through an external interface 46.

The SPU's 38 form the communication data interface between the LTU's/DTU's 40/41 and the CLU's 39. Each SPU 38 contains a number of speech processing circuits, which handle each the speech processing of one call. When a call is initiated by a handset 15 or an incoming call is received from the PBX 5 via an LTU 40 or a DTU 41, a speech processing circuit is assigned to the call. The main functions of an SPU are data transcoding, dial tone generation and detection, and echo control.

The CLU's 39 provide the communication interface between the SPU's 38 and the corresponding radio access unit or base station 50. Each CLU 39 contains a number of link circuits, and each link circuit communicates with one base station 50. The main functions of an CLU are: transmitting communication channels from the CIU 35 to a radio access unit 50 over a data line 47, and providing synchronisation and powering for the radio access unit 50. The base station control, communication control and radio link maintenance functions as described above, are implemented in the radio access unit 50. As indicated by reference numeral 48, the radio access units 50 may also be powered locally, via an AC/DC adapter.

The LTU's 40 provide an analogue interface between the PBX/LE 5 and the CPU 35. Each LTU 40 comprises a number of line termination circuits, each of which interfaces to the PBX through a 2-wire analogue subscriber line 43. Every analogue line 43 is dedicated to a specific handset 15 (FIG. 3), i.e. a specific telephone number. The main tasks of an LTU are to establish a physical connection between the PBX/LE and the CIU, on/of hook detection, ring signal detection, and analogue to digital speech processing and vice versa.

The DTU 41 provides a digital interface between the PBX/LE 5 and the CIU 35. Every DTU 41 contains a number of digital trunk circuits. Each digital trunk circuit supports a Channel Associated Signalling (CAS) interface. In an embodiment, each CAS interface provides thirty fixed 64 kb/s digital communication channels, to which thirty subscribers are assigned; i.e. a 2 Mb/s data line. Dependent on the type of the PBX/LE 5, a number of the functions of an LTU may also have to be performed by a DTU.

In accordance with an embodiment of the present invention, the CIU 35 is provided with memory means 49 operatively connected to the CPU 37. The CPU 37 and the memory means 49 are connected such to retrieve and store service specific data from the memory means 30 of a radio communication device 15 as shown in FIG. 3. In the preferred embodiment of the invention, these data are retrieved via the air interface 20 of a radio communication device 15, the base stations 50 and the CLU's 39. Each time when a user with his radio communication device 15 registers or re-registers at a radio network 11 or 12 (FIG. 2), service specific data may be automatically retrieved by the CIU 35, for example. However, such service specific data may also be retrieved via the I/O port 31 of a communication device 15 and the external interface 46 of the CIU 35 through a suitable data link or adapter, for example.

It will be appreciated by those skilled in the art that service specific data can be stored in the memory means 30 of a communication device 15 either through its air link with a base station 50 or via its I/O port 31 connected to the external interface 46 of the CIU 35. Instead of or in addition to the memory means 49 service specific data retrieved by the CIU may also be stored in memory means 34 of the PBX. In such case the CPU 37 is controlled to exchange service specific data through a DTU 41, for example.

In a practical embodiment of the CIU 35 described above, up to 600 subscribers can be connected to one CIU. This means that the line connections between the CIU 35 and the PBX/LE 5 have to support up to 600 analogue 2-wire lines in case of LTU's 40, or a 40 Mb/s digital data link in case of DTU's 41.

Figure 5:
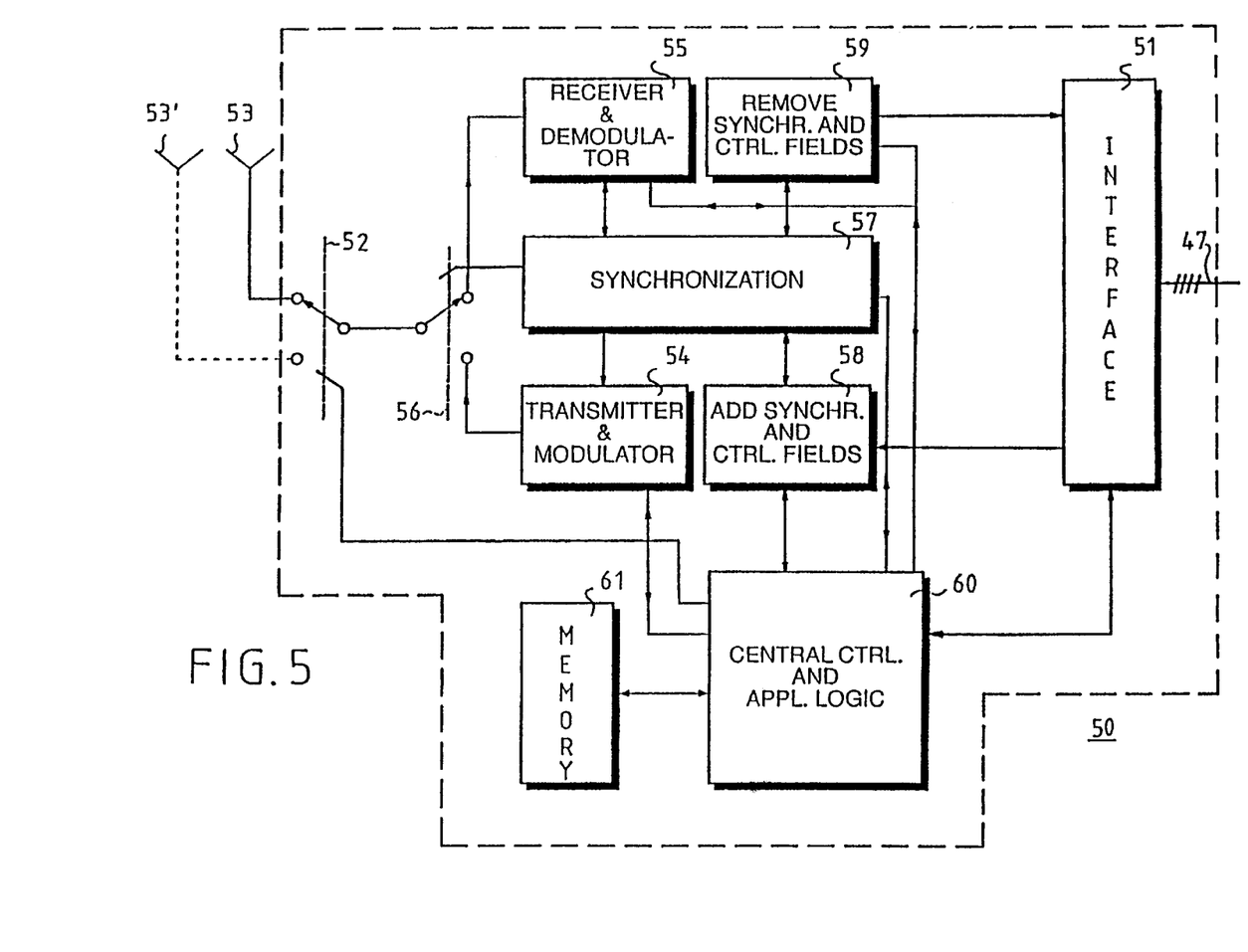
FIG. 5 shows a simplified block diagram of an embodiment of a base station forming part of a radio communication system according to the present invention.

FIG. 5 shows a simplified block diagram of a radio access unit or base station 50, equipped for operating in accordance with an embodiment of the invention. The access unit 50 comprises a line interface 51 having a data link 47 to a CIU 35 as shown in FIG. 4. Over this data link 47 multiple telephone calls can be exchanged.

On the radio side, the access unit 50 comprises an air interface having the form of an antenna 53, 53' connecting to a radio unit comprising a transmitter/modulator unit 54 and a receiver/demodulator unit 55. Both units 54 and 55 are coupled to the antenna 53, 53' via a Transmit/Receive (T/R) switch 56. The base unit 50 also comprises a synchronisation unit 57, which controls the transceiver timing. In case of TDMA/TDD technology such as DECT this synchronisation unit 57, amongst others, controls the frame and time slot synchronisation of the system. Timing reference is either internally generated or derived from a synchronisation signal received from the CIU 35 over the data link 47 or an external timing reference source, for example.

Further, control and synchronisation units 58 and 59 are provided, connected to the transmitter 54 and the receiver 55, respectively, for processing the separate calls. Unit 58 adds control and synchronisation information to the individual calls which have to be transmitted, whereas unit 59 removes this information from the received calls before feeding to interface 51. The units 57, 58 and 59 may be integral.

The base unit 50 further comprises a Central Control and application Logic (CCL) 60, comprising a microprocessor or microcontroller and memory means. The CCL 60 detects all incoming calls and controls all outgoing calls via the antenna 53, 53' and merges the different connections and radio channels through the interface 51. In case of a multi-carrier multi-time-slot technology, such as DECT, the CCL 60 controls the various combinations of carrier frequencies and time-slots. As indicated by switches 52, if antenna diversity is implemented, the choice between the first antenna 53 and a second antenna 53' is also controlled by the CCL 60.

In accordance with an embodiment of the present invention, memory means 61 are provided which are operatively connected to the CCL 60 such to store service specific data retrieved from a remote radio communication device 15 and/or from the system through the CIU 35, for example. Such data is retrieved under control of the CCL 60 via the receiver 55 respectively the interface 51. If required, the CCL can be arranged to transmit via the transmitter 54 or the interface 51 service specific data to the remote radio communication device 15 or the CIU 35, respectively.

The method according to the present invention can be best illustrated by way of the content of the memory means 30 of a telecommunication device 15 (FIG. 3) in an embodiment of the invention, wherein the memory means 30 comprise service specific data stored in the form of a so-called translation Table 1. The Table 1 is of the matrix type comprising rows in the horizontal direction and columns in the vertical direction when viewed in the plane of the sheet. At the upper row several radio networks are listed by their reference or type number. That is, network 765, network 766, networks 723–731 and network 841. In this particular case, it is assumed that the telecommunication system comprises twelve communication networks. Further, the telecommunication device 15 can place and receive calls in all the networks.

Each row of the translation table lists data specific to a particular service in a particular network. The service specific data headed by the designation "ACCESS CODES" refer to access codes characterising a particular network or networks and which are relevant to place a call.

The service specific data denoted "SUPPLEMENTARY SERVICES" refer to data in order to access services of the network or to have a particular service performed by the network.

From Table 1, "ACCESS CODES" the following information can be retrieved:

Network 765: To get an external line a "0" has to be dialled, i.e. public access PBX. The network is located in the country having the country code "31" and is connected to the PSTN via a switch having the area code "020". International access can be achieved by dialling "00", whereas the local prefix in case of short number dialling is "57 11".

Network 766: Like network 765, this network is connected to a switch having the area code "020", however the local prefix is "63 28".

Networks 723–731: Different from network 765 and 766, an external line can be accessed by dialling "9" as the public access code PBX, whereas these networks are located in an area having the area code "053" and the local prefix is "45 05".

Network 841: This network is located in the country having the country code "46". An external line is set up through dialling "00" and international access is achieved by dialling "09" as the international access code. The area code is "8" and the local prefix "757" has to be followed by a four-digit abbreviated number.

Let's assume a user having a radio telephone device the home network of which is network 765 and having assigned the international type subscriber number +31 20 57 11 311. The + sign denotes the international access code, the next two digits represent the country code, the following two digits refer to the area code (any leading "0" not included) and the remainder of the digits are the (local) subscriber number. It is further assumed that the home network provides short number dialling. That is, if a user in his home network would like to place a call to another subscriber of the home network, e.g. subscriber +31 20 57 11 398, it is sufficient to dial only a few of the last digits of the number, for example the last three digits, i.e. "398".

However, if the user roams to another network, for example network 766, dialling of "398" will not result in a connection to the requested home network subscriber. This, because the network 766 may have assigned these digits to one of the subscribers for which this network forms the home network or because more or less digits have to be dialled in a particular network for the purpose of short number dialling.

After roaming, the telecommunication device will be first registered at a particular network, assume the network 766. This can be achieved, for example, following an automatic registration procedure once the telecommunication device is put into operation. Such as described in the DECT standard, for example. By this procedure, the telecommunication device knows in which network it is operating. After, or in the course of this registration procedure the relevant service specific data of the network 766 as indicated in Table 1, for example, may be stored in the memory means of the telecommunication device by the network 766. However, this data may also be stored beforehand in the memory means of the telecommunication device by a suitable data programming means or in detachable memory means, for example.

Following the method of the invention, assuming that the user of the telecommunication device has chosen to operate his device in the same manner as in his home network 765, that is he would like to access services in the same manner as he is used to do in his home network 765, the user will dial "398" to be connected to subscriber "398" of his home network.

The telecommunication device knows from the registration procedure that it is not in its home network 765 but in the network 766, however it is operating according to the user interface of network 765. From Table 1, the telecommunication device now retrieves the following information:

- the dialled "398" is recognised as a short number of the network to which the user interface relates, i.e. network 765, such that from network 766 an external line has to be accessed for which the dialled "398" has to be preceded by a "0" in the network 766;
- the country code "31" of the user interface equals the country code of the present network and can be skipped;
- because no country code has to be dialled, the international access code "00" can be skipped too;
- the area code of the network to which the user interface relates, i.e. network 765, equals the area code of the present network 766, accordingly no area code has to be added;
- the local prefix of network 766 is "63 28" which differs from the local prefix of the user interface network such that the dialled number has to be preceded by "57 11" in order to set up the call.

Accordingly, the dialled number "398" has to be preceded by "0 57 11" in order to set up the call from network 766. From the above example, it can be seen that for placing a call to subscriber "398" from any of the networks 723–731, for example, the string "9 020 57 11" has to be added. In particular the area code "020" has to be added, because from Table 1 it can be retrieved that the networks 723–731 are located in area "053" which differs from the required area code of the user interface network.

Calling from network 841 the dialled "398" has to be preceded by the string "00 09 31 20 57 11", because the network 841 is also located in a different country compared to the user interface. It will be understood that the leading "0" of the area code can be skipped because the call is set up from a different country.

Assume that the above user has roamed to and is registered at network 766. In case he or she would like to call subscriber "285" of the network 766 while the telecommunication device operates under the user interface of network 765, the complete subscriber number of subscriber "285" has to be dialled just as if the call is placed from the home network. That is, the user will dial "0 63 28 285". The first "0" to get an external line and because the user knows that the required subscriber is in the same area as his home network no area code needs to be dialled. Note that in some cases an area code may be dialled too.

From Table 1 the following information can be retrieved. First it will be checked whether the public access PBX code has to be changed. In the present case the dialled public access code of the user interface network equals the public access code to be dialled from network 766, such that no amendments have to be made. Due to the absence of an area code, it is clear that the area code of the required subscriber equals the area code of the network to which the user interface refers. Accordingly, it is checked whether the area codes of networks 766 and 765 are equivalent or not. In this case, the area codes are equal such that no amendments have to be made. The call can be set up.

Assume that the call is set up from any of the networks 723–731 and that the user again dials "0 63 28 285". First, the public access PBX code has to be changed in "9". Second, there has to be added the area code "020" of the user interface network 765 because the area code of the user interface network 765 differs from the area code "053" of the present network. Because of the fact that no area code has been dialled the area code of the requested subscriber has to be the same as the area code of the user interface network. Accordingly, the dialled string will be "9 020 63 28 285".

In a more intelligent embodiment it can be also checked by the network 766 whether the requested subscriber is located with this network. In the present example the dialled local prefix equals the local prefix of network 766 and subscriber "285" is registered at the network 766. Accordingly, the dialled "0 63 28" may be skipped and it is sufficient to use the short number "285" to set up the call.

The above retrieval and processing of the service specific data from Table 1, i.e. the memory means of the telecommunication device, can be efficiently performed in the telecommunication device itself. However, the relevant data can also be retrieved from and processed by the network to which the telecommunication is presently registered. It will be appreciated by those skilled in the art that a combined retrieval and processing of data by both the network and the telecommunication device is also possible and, in some cases, can provide a very efficient operation.

In addition to services relating to access of the network as described above, supplementary services like Call Back (CB), Call Forwarding Unconditional (CFU), Call Forwarding on No Reply (CFNRy), Call Forwarding on Busy (CFB), Call Hold (HOLD), etc. can be provided to a user. Besides the permission to access these services, which can be controlled by acquiring access rights, it may be necessary to input different commands in order to access a particular service from a particular network.

To illustrate the method according to the present invention in case of such supplementary services, an example will be discussed concerning the services CFU and CFB. From Table 1, "SUPPLEMENTARY SERVICES", the following can be retrieved:

Network 765: The service CFU can be activated by dialling *21 followed by the extension number to which all incoming calls have to be diverted, i.e. indicated by ????, and terminated by the # sign. The service can be cancelled by dialling *21*. CFB can be activated by dialling *22. The extension number to which the calls shall be diverted in case of busy is listed on the row extension CFB, i.e. the short extension number "300". CFU can be cancelled by dialling *22*.

Network 766: CFU has to be activated by the string *21#????# and terminated by *22#. Activation of CFB requires dialling of *21* and can be terminated by *22*.

Networks 723–731: To activate CFU the user has to dial *22????#. To terminate this service *22* has to be dialled. CFB requires *21 for its activation and *21* to terminate this service.

Network 841: The user has no access to CFU or CFB from this network.

Assume that the user applies the network interface of his home network 765 and roams to network 766. In the network 766 the user would like to use the service CFU. After registration, the user dials *21399#. This to activate the CFU service and to forward all the calls to subscriber "399" in the network 765, i.e. its user interface network.

First, there will be checked whether the particular activation string is also valid for the present network. Because the user interface refers to network 765, it can be retrieved from Table 1, network 765, that the code *21 relates to activation of the service CFU. However, the telecommunication device is registered at the network 766. Accordingly, to activate CFU from this network the string *21# has to be dialled, thus the dialled string *21 will be replaced by *21#. Next the extension number "399" has to be evaluated. Again, from the chosen user interface it is clear that this is a short number in network 765 and has to be replaced by "0 57 11 399", as illustrated above. Accordingly, there will be dialled in network 766 the string "*21#0 57 11 399" and all the calls arriving in network 766 for the user will be diverted to extension "399" in network 765.

It will be appreciated that termination of the CFU service will result in replacement of the string *21* by the string *22#. Note that the user has no access rights to the service CFU from network 841! In order to prevent unauthorised subscription to services, the data relating to supplementary services can be enhanced by access right codes and/or stored in an encrypted manner.

In the case of CFB, the network can retrieve from Table 1 the extension number to which a call has to be diverted. In this case only one extension number has been provided, i.e. extension "300" in the network 765. This extension number can be stored by the user using his keypad and all calls will be forwarded to this extension regardless of the network to which the user is presently registered. However, it is also possible to initiate a network dependent diversion or forwarding of calls. That is while registered at network 766 calls on busy subscriber may be diverted to the extension "287" in network 766. To this end, the particular extension number can also be keyed in from the keypad of a telecommunication device, or otherwise. The several extension numbers may also be stored in an international type form +31 20 57 11 300, for example. As discussed above, the stored numbers will be processed in accordance with the chosen user interface and the relevant information characterising the present network.

Like the above access codes, the information from Table 1 relating to supplementary services can be retrieved and processed by either one or both the telecommunication device and the network.

It is also possible that the user of a telecommunication device will change its user interface to any of the other networks. For example to make use of short numbers in the network 766. Accordingly, the user has to place calls as if he or she is registered at the network 766. It is also possible to use a universal type user interface for the telecommunication system as a whole, for example. The relevant information as to access codes and supplementary services can be listed in Table 1 like any of the networks. In this manner the necessary conversions, additions etc. are calculated with reference to such universal interface as illustrated above with reference to the user interface of network 765.

From the above it will be understood that the user is provided in a consistent manner with a set of services when roaming through different communication networks of a telecommunication system. With the present invention the user does not has to possess any knowledge of how to access services in all the networks of the system. Rather, he or she can stick to a user interface which is known to him in order to access the services.

Further, following the present invention, the network can retrieve information from the memory means of the telecommunication device for inquiry purposes. One may think of service numbers, billing data etc. The "extension CFB" number in Table 1 is an example of information which can be retrieved by the network in an enquiry mode in order to get the number to which a call has to be forwarded.

The invention is not limited to the above described exemplary services and implementation. Those skilled in the art will appreciate that the several access codes and/or supplementary service data can be stored in different formats. The table format can also be replaced by a suitable software conversion algorithm, for example. The invention can be applied in different types of networks, including wired and wireless networks such as GSM, DECT, PHS etc.

TABLE 1

|  | network 765 | network 766 | networks 723–730 | network 841 |
|---|---|---|---|---|
| ACCESS CODES |  |  |  |  |
| public access PBX | 0 | 0 | 9 | 0 |
| country code | 31 | 31 | 31 | 46 |
| international | 00 | 00 | 00 | 009 |
| area code | 020 | 020 | 053 | 08 |
| local prefix | 57 11 | 63 28 | 45 05 | 757 |
| SUPPLEMENTARY SERVICES |  |  |  |  |
| activate CFU | *21????# | *21#????# | *22????# | no access |
| cancel CFU | *21* | *22# | *22* | no access |
| activate CFB | *22 | *21* | *21 | no access |
| cancel CFB | *22* | *22* | *21* | no access |
| extension CFB | 300 |  |  |  |

What is claimed is:

1. In a telecommunication system including a plurality of communication networks, a method of providing a user with a consistent set of services when roaming through said networks using a mobile telecommunication device, said telecommunication device having memory means for storing data specific to said set of services of said telecommunication system, comprising the steps of:

exchanging service specific data between said telecommunication device and a communication network when accessing said communication network, and providing services to the user based upon translated data, wherein said translated data is processed at least in part by the telecommunication device using said service specific data received from said accessed communication network.

2. A method according to claim 1, wherein at least part of said service specific data is exchanged over a transmission path established between said telecommunication device and said network.

3. A method according to claim 1, wherein at least part of said service specific data is retrieved by said network from said telecommunication device, and wherein retrieved data are stored in memory means of said network.

4. A method according to claim 3, wherein said retrieved data are temporarily stored in said memory means of said network, at least for the duration of providing service to said telecommunication device.

5. A method according to claim 1, wherein at least part of said service specific data is retrieved by said telecommunication device from said network, and wherein said retrieved data are stored in said memory means of said telecommunication device.

6. A method according to claim 5, wherein said retrieved data are temporarily stored in said memory means of said telecommunication device, at least for the duration of providing service to said telecommunication device.

7. A method according to claim 1, wherein said service specific data are stored in said memory means of said telecommunication device in connection with data representative of a particular network including a particular group of networks.

8. A method according to claim 1, wherein said service specific data are stored in said memory means of said telecommunication device restricted to services available to a user of said telecommunication device.

9. A method according to claim 1, wherein said service specific data comprise service access rights data indicating services available to a user of a telecommunication device.

10. A method according to claim 1, wherein said service specific data are stored in said memory means of said telecommunication device relative to data corresponding to service access rights representative of services available to a user of a telecommunication device.

11. A method according to claim 1, wherein at least part of said service specific data is stored in said memory means of said telecommunication device in an encrypted form.

12. A method according to claim 1, wherein said service specific data are stored in said memory means of said telecommunication device relative to a particular user interface.

13. A method according to claim 12, wherein said service specific data are stored in the form of a translation table, such to translate service specific data relative to said user interface into service specific data relative to said accessed network.

14. A method according to claim 12, wherein said service specific data are stored in the form of a translation algorithm, such to translate service specific data relative to said user interface into service specific data relative to said accessed network.

15. A method according to claim 12, wherein said user interface is chosen among the user interface of any of the networks of said telecommunication system, including a dedicated user interface and a universal type of user interface.

16. A method according to claim 15, wherein said telecommunication device has one of said networks of said telecommunication system as its home network, and wherein said user interface corresponds to the user interface of said home network.

17. A mobile radio telecommunication device for use in a telecommunication system including a plurality of networks, said telecommunication device comprising transceiver means, communication control means, and memory means arranged for storing data specific to services of said telecommunication system, wherein said telecommunication device being arranged for exchanging service specific data with a communication network when accessing said network, wherein the service specific data received from said accessed communication network is used for translating data to service specific data of said telecommunication device, and wherein said translation is processed at least in part by said telecommunication device.

18. A telecommunication device according to claim 17, wherein said memory means are arranged for storing said service specific data in connection with access data identifying a particular network including a particular group of networks, and comprising means for identifying an accessed network, said means being operatively connected to said memory means such to retrieve service specific data corresponding to the network and group of networks accessed.

19. A telecommunication device according to claim 17, comprising display means and user interface control means for displaying service specific user data in accordance with a particular user interface, and wherein said memory means are arranged to store said service specific data relative to said user interface.

20. A telecommunication device according to claim 19, wherein said service specific data are stored in the form of a translation table, such to translate service specific data relative to said user interface into service specific data relative to said accessed network.

21. A telecommunication device according to claim 19, wherein said service specific data are stored in the form of a translation algorithm, such to translate service specific data relative to said user interface into service specific data relative to said accessed network.

22. A telecommunication device according to claim 17, comprising means for storing service specific data into said memory means received via said transceiver means, via other data input means connectable to said telecommunication device including keypad means of said telecommunication device.

23. A telecommunication device according to claim 17, wherein said memory means are separate to the telecommunication device and wherein said telecommunication device comprises means for operatively connecting said separate memory means.

24. A telecommunication device according to claim 23, wherein said connecting means of said telecommunication device comprise a connector for releasable connection of said memory means.

25. A radio telecommunication system, including a plurality of radio communication networks each comprising radio exchange means, at least one radio base station operatively connected to said radio exchange means and comprising radio transceiver means and communication control means for exchanging information over a radio link with at least one telecommunication device arranged for exchanging service specific data with a communication network when accessing said network, wherein a radio communication network comprises means for exchanging service specific data with a telecommunication device, and memory means for storing retrieved service specific data, and wherein said retrieved service specific data is translated at least in part by said telecommunication device in order to provide services to the user.

26. A radio communication system according to claim 25, wherein said data retrieval and memory means are located at one of said radio exchange means, said base stations, and switching means to which said radio communication network connects via said radio exchange means.

27. A radio communication system according to claim 26, wherein a radio communication network comprises means for providing service specific data to be stored in memory means of a telecommunication device, said means being arranged for transmitting said service specific data via a radio link established between a base station and said telecommunication device and data input means connectable to said telecommunication device.

28. A method of providing a mobile user with consistent services in a radio communication system with at least a home location network and a visitor location network, wherein said home location network uses a first code for a service and said visitor location network uses a second code for said service, and wherein said first code is different from said second code, comprising the steps of:

storing in a mobile unit service data of said first code;

roaming, in said mobile unit, to said visitor location network;

receiving, over an air-interface, in said mobile unit service data of said second code;

storing said second code in said mobile unit;

requesting by said user, said service by inputting said first code;

translating, in said mobile unit, said first code into said second code; and transmitting, over the air interface, second code to request said service from said visitor location network.

* * * * *